United States Patent [19]

Florian

[11] Patent Number: 5,073,353

[45] Date of Patent: Dec. 17, 1991

[54] CATALYTIC CONVERTER FRONT FLANGE AND METHOD OF MAKING SAME

[75] Inventor: Roy S. Florian, Southington, Conn.

[73] Assignee: Nickson Industries, Inc., Plainville, Conn.

[21] Appl. No.: 436,430

[22] Filed: Nov. 14, 1989

[51] Int. Cl.⁵ ............................................. F16L 23/032
[52] U.S. Cl. ..................... 422/310; 248/316.4; 285/61; 285/415; 285/420; 422/179
[58] Field of Search ............... 285/414, 415, 420, 61, 285/400, 412, 413; 24/514, 522, 569; 422/310, 179, 180, 181; 248/231.4, 62, 316.4

[56] References Cited

U.S. PATENT DOCUMENTS

| | | | |
|---|---|---|---|
| 401,996 | 4/1889 | Brogden | 285/412 |
| 624,671 | 5/1899 | O'Brien | 248/62 |
| 961,987 | 6/1910 | Rust | 285/412 |
| 1,520,028 | 5/1920 | Krause | 285/405 |
| 1,784,667 | 12/1930 | Gillet | 285/415 X |
| 2,631,346 | 3/1953 | Wengen et al. | 248/316.4 |
| 2,683,613 | 7/1954 | Streed et al. | 285/413 |
| 2,764,431 | 9/1956 | Wilde | 285/415 |
| 2,911,239 | 11/1959 | Marzolf | 285/415 |
| 3,008,735 | 11/1961 | Van Wijngaarden | 285/61 |
| 3,415,547 | 12/1968 | Yano | 285/337 |
| 3,479,145 | 11/1969 | Lentz | 422/181 |
| 3,515,416 | 6/1970 | Pickert | 285/413 |
| 3,604,733 | 12/1971 | Hubbell | 285/334.1 |
| 3,704,995 | 12/1972 | Hetherington | 285/332 |
| 3,941,172 | 3/1976 | DeMartelaere | 114/392 |
| 3,942,599 | 3/1976 | Shimada | 180/292 |
| 4,336,959 | 6/1982 | Roche | 285/368 |
| 4,397,486 | 8/1983 | Ohya | 285/368 |
| 4,516,782 | 5/1985 | Usher | 277/1 |
| 4,519,639 | 5/1985 | Florian | 285/415 |
| 4,547,344 | 10/1985 | DiVilio et al. | 422/310 |
| 4,615,500 | 10/1986 | Layson | 248/65 |
| 4,643,458 | 2/1987 | Ammar | 285/62 |
| 4,730,852 | 3/1988 | Arscott | 285/15 |

FOREIGN PATENT DOCUMENTS 57283 3/1984 Canada.

OTHER PUBLICATIONS

Photograph General Motors Catalytic Converter Flange OEM.

*Primary Examiner*—Robert J. Warden
*Assistant Examiner*—Amalia L. Santiago

[57] ABSTRACT

A replacement flange for the end of a catalytic converter is provided by a pair of generally L-shaped coupling elements which have their base portions opposed and seated in an elongated channel element which permits one coupling element to slide therein relative to the other. The opposed edges of the flange coupling elements are generally arcuate to fit about the end pipe of the converter and have recesses to seat the flanges on the sides of the converter body. Assembly is effected by mounting one coupling element to the automobile support structure about the converter end and then sliding the other coupling element sideways into engagement therewith and mounting it to the support structure.

16 Claims, 2 Drawing Sheets

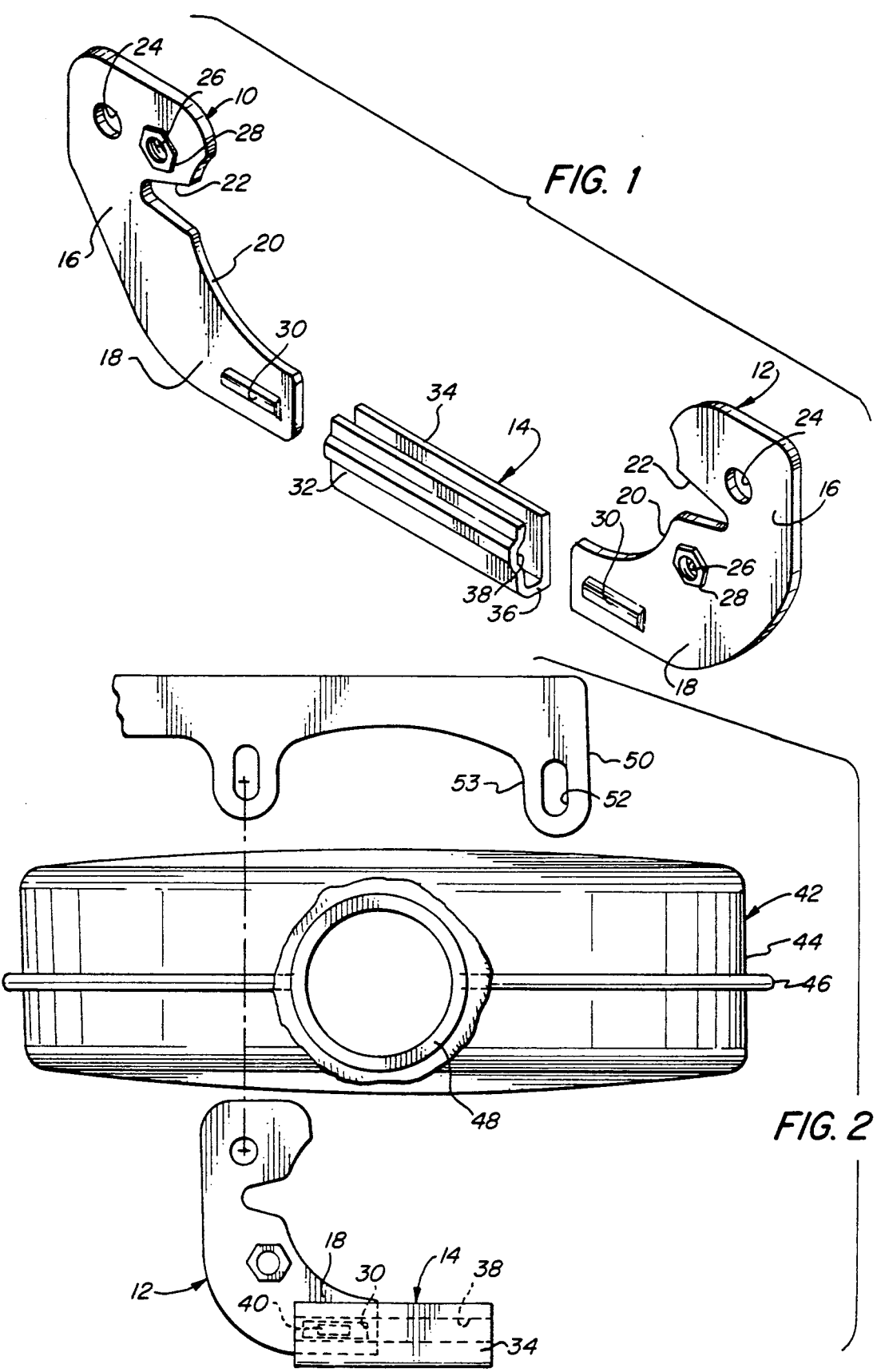

CATALYTIC CONVERTER FRONT FLANGE AND METHOD OF MAKING SAME

BACKGROUND OF THE INVENTION

The present invention relates to replacement flanges for catalytic converters, and, more particularly, to such flanges which can be readily assembled by the mechanic about the catalytic converter and to the flange for the exhaust system without extensive disassembly and while all the parts are relatively hot.

As is well known, the catalytic converters on most vehicles are supported by original equipment flanges which are custom designed for a given vehicle, and which are frequently of one piece construction. Unfortunately, corrosion and heat cycling may cause failure of the flanges while the converter is still functional, and cause failure of the connection to the exhaust system. Unless promptly replaced, the converter itself may be damaged and repair of the sealed converters is impracticable.

Replacing the flanges with original equipment flanges may require some disassembly of the exhaust system in order to provide sufficient space for maneuvering the replacement flange into position, and for securing it about the catalytic converter.

It is generally advantageous for garages and the like to stock a limited number of replacement parts which can be utilized on more than one vehicle. Moreover, to reduce the cost of repair, it is desirable that the mechanic be able to install replacement flanges without any major disassembly of other parts, and, in the instance of exhaust system components, without having to wait for a substantial period of time for the parts to cool sufficiently so that the mechanic will not be burned when working thereabout.

It is an object of the present invention to provide a novel replacement flange for the end of catalytic converters which can be assembled quickly and easily about the converter.

It is also an object to provide such a flange which may be fabricated relatively economically from sheet metal stock.

Another object is to provide such a flange which may be installed with limited potential for contact of the mechanic's hands with hot parts of the exhaust system.

Still another object is to provide a method for quickly and easily installing such replacement flanges on vehicles.

SUMMARY OF THE INVENTION

It has now been found that the foregoing and related objects and advantages may be readily attained in a novel replacement flange for the end of a catalytic converter. This replacement flange has a pair of opposed coupling elements each having a generally vertically extending leg portion and a generally horizontally extending base portion, and the opposing edges of the coupling elements have a portion of arcuate configuration to seat a portion of the periphery of the outlet pipe of an associated catalytic converter and aligned recesses to seat the side flanges of the catalytic converter. The elements being spaced apart at the upper end of their leg portions, and each of the coupling elements has a plurality of bolt receiving apertures therein for mounting upon the support structure of the associated vehicle and for coupling to the flange of the associated exhaust system of the vehicle. A channel element seats and joins the opposed ends of the base portions of the coupling elements, and it permits horizontal sliding motion therein of one of the coupling elements relative to the other.

Preferably, the channel element is of elongated, generally U-shaped cross section defined by a pair of vertical legs and a base, and one of the legs has a groove in its inside surface extending along the length thereof. The base portion of at least one of the coupling elements has a boss thereon which slidably seats in this groove. Desirably each of the coupling elements has a boss seated in the groove, and the other one of the coupling elements and the channel element are fixedly engaged by staking or the like.

In the preferred embodiment, each of the coupling elements is of generally plate-like configuration with the boss being formed by deformation of the material from which the coupling element is formed, and the apertures for coupling to the exhaust system have internally threaded nuts thereabout to seat threadably the shanks of fasteners.

In the method of mounting the replacement flange on the end of a catalytic converter, a channel element is mounted on the base portion of one coupling element and it projects beyond the end of the base portion. The mounting the upper end of the leg portion of the coupling element is mounted upon the support structure of the vehicle with its arcuate edge extending about a portion of the outlet pipe of the catalytic converter. The other one of the coupling elements is moved horizontally to slidably seat its base portion in the channel and to seat its arcuate edge about another portion of the outlet pipe of the catalytic converter. As a result, the channel element seats and joins the opposed ends of the base portions of the coupling elements and provides horizontal sliding motion therein of the other coupling element prior to finally securing both coupling elements to the automobile support structure. The upper end of the leg portion of the other coupling element is then mounted on the support structure of the vehicle, and the flange of the exhaust system for the vehicle is coupled to others of the apertures of the coupling elements.

BRIEF DESCRIPTION OF THE DRAWINGS

FIG. 1 is a partially exploded view of the elements of a catalytic converter replacement flange embodying the present invention;

FIG. 2 is a partially exploded end view of a fragmentary portion of the support bracket, catalytic converter, and one coupling element prior to its movement vertically to engage with the mounting aperture on the support bracket;

DETAILED DESCRIPTION OF THE ILLUSTRATED EMBODIMENTS

Figure 3:
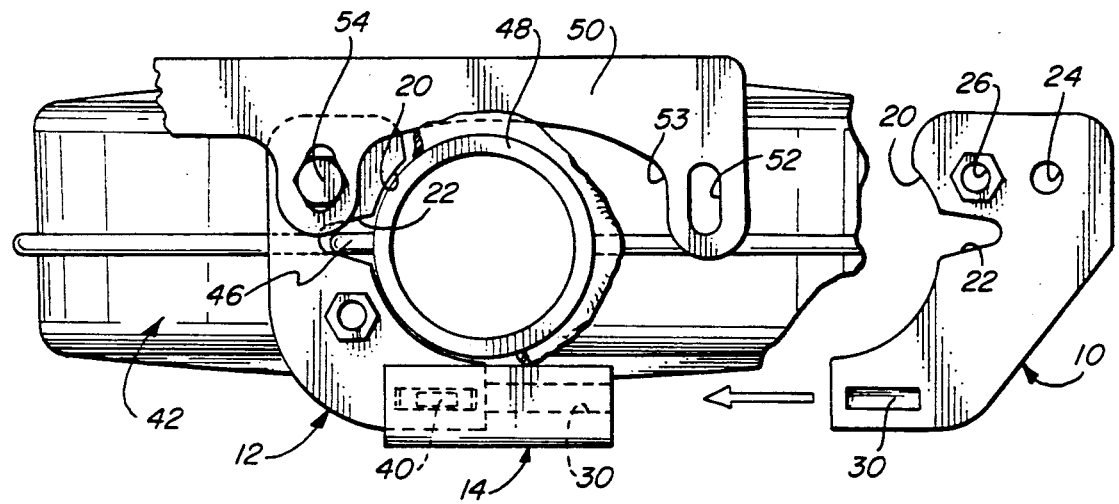
FIG. 3 is a similar end view with the one coupling element secured to the support bracket and the other in position to be moved horizontally into engagement with the first.
Figure 4:
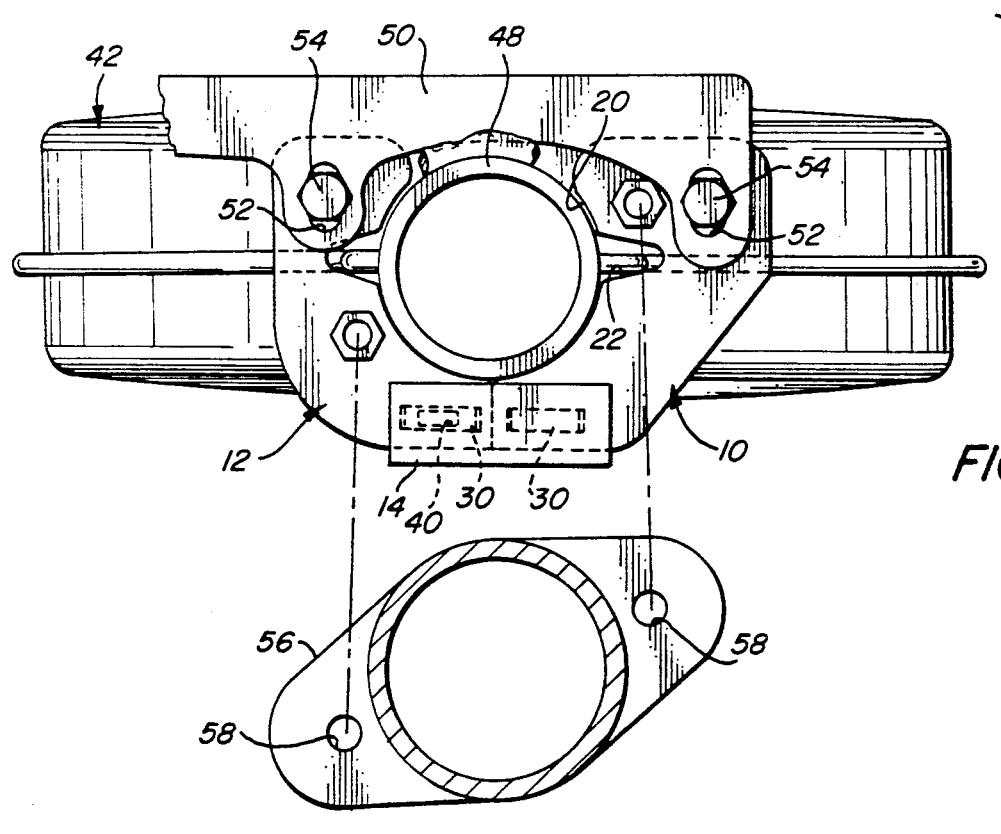
FIG. 4 is a similar end view showing the coupling elements assembled and the detached exhaust system flange piece which is to be assembled thereto.

Turning first to FIG. 1, a replacement flange is shown in substantially exploded form. It is comprised of a pair of coupling elements generally designated by the numerals 10 and 12 and a channel element generally designated by the numeral 14 which slidably receives the coupling elements 10,12 therein.

Each of the coupling elements 10,12 is of generally L-shaped configuration with a vertically extending leg portion 16 and a horizontally extending base portion 18. The opposed edges have portions 20 of generally arcuate configuration and recesses 22 therein. The upper ends of the leg portions 16 have apertures 24 therein, and the leg portions 16 also have apertures 26 in which are seated internally threaded nuts 28. The base portions 18 have elongated bosses 30 formed by upsetting the sheet metal, and these bosses are dimensioned and configured to slidably seat in the groove 38 of the channel element 14.

As can be seen, the channel element 14 is of generally U-shaped cross section with a pair of leg portions 32,34 and a base 36. The groove 38 is formed in the leg portion 34. As seen in FIG. 2, the metal forming the leg portion 34 of the channel element 14 is deformed or staked to lock into the boss 30 of the coupling element 10. This cures the two elements in assembly.

As also seen in FIG. 2, the catalytic converter generally designated by the numeral 42 has a body 44 with welded side flanges 46 extending thereabout, and an outlet pipe 48 of generally cylindrical configuration. Secured to the chassis or a portion of the transmission (neither of which is shown) is a mounting bracket 50 having a pair of elongated holes 52 in depending leg portions 53.

In assembling the replacement flange, the coupling element 10 is moved into position with its aperture 24 in alignment with the hole 52 in the bracket 50, and a bolt and nut are assembled thereto to secure the coupling element 10 in position. As seen in FIG. 3, the arcuate edge portion 20 of the coupling element 10 encircles a portion of the periphery of the outlet pipe 48, and the flange 46 on the side of the catalytic converter 42 extends into the recess 22 thereof. The bolt 54 is shown as secured in the aperture 24 of the flange 10 and hole 52 of the bracket 50.

As also shown in FIG. 3, the other coupling element 12 is located at a horizontally spaced position, and then it is moved horizontally to seat its boss 30 in the groove 38 of the channel element 14 and to bring its mounting aperture 24 into alignment with the hole 52 in the bracket 50. At this point, another bolt 54 is inserted thereinto and locked by a nut (not shown). As in the instance of the coupling element 10, the arcuate edge portion 20 of the coupling element 12 seats closely about another portion of the outlet pipe 48, and the side flange 46 of the catalytic converter 42 extends into the recess 22.

In the final step, the muffler flange generally designated by the numeral 54 is moved so that the holes 58 therein align with the internally threaded nuts 28, and bolts are inserted therethrough and tightened into the nuts 28 to secure the parts in assembly..

As will be readily appreciated, the coupling elements may be readily stamped from metal plate stock to provide the desired contours, apertures and bosses. The apertures to receive the threaded nuts are conveniently formed with a hexagonal configuration and clinch nuts having a hexagonal collar are inserted thereinto and the metal of the deformed so as to secure them in place.

The channel element is conveniently formed by rolling plate stock to the desired contour, although it may be fabricated at greater cost by machining bar stock.

After the channel element has been moved into position on the one coupling element, a punch is utilized to upset the metal of the channel element to lock the boss of the coupling element in the groove and prevent relative motion therebetween.

As will be appreciated, the use of the boss and channel arrangement allows the coupling elements to be easily assembled about the outlet pipe of the catalytic converter without having to bring the mechanic's hands closely into contact with hot surfaces. Moreover, some degree of misalignment and variation in size is accommodated by the sliding engagement of the two coupling elements. Thus, although sliding engagement is provided to enable the initial assembly of the flange elements about the catalytic converter, the engagement of the fasteners in the mounting bracket or other support structure of the chassis and to the exhaust system flange rigidifies the entire assembly about the catalytic converter.

The placement of the apertures for mounting the replacement flange on the automobile's support structure can be varied as can be the placement of the apertures for seating the bolts to secure the exhaust system flange thereto. Moreover, for greater flexibility, multiple apertures may be provided.

Thus, it can be seen from the foregoing detailed specification and attached drawings that the replacement flange of the present invention is one which can be relatively easily and economically fabricated and assembled about the converter with relative ease. Moreover, the elements of the flange accommodate some variation in dimension and alignment, and they may be assembled so that the mechanic does not have to come into contact with the hot surfaces of the exhaust system. When assembled, the flange provides secure support for the end of the catalytic converter and a solid joint with the flange for the exhaust system.

Having thus described the invention, what is claimed is:

1. A replacement flange for the end of a catalytic converter of the type having outwardly extending flanges along its sides and an outlet pipe which is coupled to the flange of the associated vehicle exhaust system and which converter is mounted upon support structure of an associated vehicle, said flange comprising:

(a) a pair of coupling elements opposite each other having opposing edges, each element having a generally vertically extending leg portion and a generally horizontally extending base portion, the opposing edges of said coupling elements having an arcuate configuration to seat a portion of the periphery of the outlet pipe of an associated catalytic converter and aligned opposed recesses to seat the side flanges of the associated catalytic converter, said elements being spaced apart at the upper end of said leg portions, each of said coupling elements having a plurality of bolt receiving apertures therein for mounting upon the support structure of the associated vehicle and for coupling to the flange of the associated exhaust system of the vehicle; and (b) a channel element for seating and joining the opposed ends of said base portions of said coupling elements, said channel element permitting horizontal sliding motion therein of one of said coupling elements relative to the other.

2. The replacement flange in accordance with claim 1 wherein said channel element is of elongated, generally U-shaped cross section defined by a pair of vertical legs and a base, one of said legs having a groove in its inside surface extending along the length thereof, said base portion of at least one of said coupling elements having a boss thereon which is slidably seated in said groove.

3. The replacement flange in accordance with claim 2 wherein each of said coupling elements has a boss to be seated in said groove.

4. The replacement flange in accordance with claim 3 wherein the other one of said coupling elements and said channel element are fixedly engaged.

5. The replacement flange in accordance with claim 3 wherein said other one of said coupling elements and said channel element are mechanically engaged by staking or the like.

6. The replacement flange in accordance with claim 1 wherein said channel element is fixedly engaged with the other one of said coupling elements.

7. The replacement flange in accordance with claim 2 wherein each of said coupling elements is of generally plate configuration with said boss being formed by deformation of the material from which the coupling element is formed.

8. The replacement flange in accordance with claim 7 wherein the apertures for coupling to the associated exhaust system have internally threaded nuts thereabout to seat threadably the shanks of fasteners.

9. A replacement flange for the end of a catalytic converter of the type having outwardly extending flanges along its sides and an outlet pipe which is coupled to the flange of the associated vehicle exhaust system and which converter is mounted upon support structure of an associated vehicle, said flange comprising:
(a) a pair of coupling elements opposite each other having opposed edges, each element having a a generally vertically extending leg portion and a generally horizontally extending base portion, the opposing edges of said coupling elements having an arcuate configuration to seat a portion of the periphery of the outlet pipe of an associated catalytic converter and aligned opposed recesses to seat the side flanges of the associated catalytic converter, said elements being spaced apart at the upper end of said leg portion, each of said coupling elements having a plurality of bolt receiving apertures therein for mounting upon the support structure of the associated vehicle and for coupling to the flange of the associated exhaust system of the vehicle; and
(b) a channel element of elongated, generally U-shaped configuration defined by a pair of vertical legs and a base, said channel element for seating and joining the opposed ends of said base portions of said coupling elements when assembling said replacement flange about said catalytic converter, and providing relative horizontal sliding motion of one of said coupling elements relative to the other during assembly, one of said legs of said channel element having a groove in its inside surface extending along the length thereof and said base portion of at least one coupling element having a boss thereon which is slidably seated in said groove, said channel element being fixedly engaged with the other one of said coupling elements.

10. The replacement flange in accordance with claim 9 wherein each of said coupling elements has a boss to be seated in said groove.

11. The replacement flange in accordance with claim 9 wherein each of said coupling elements is of generally plate confirmation with said boss being formed by deformation of the material from which the coupling element is formed.

12. The replacement flange in accordance with claim 11 wherein internally threaded nuts are secured to said coupling element at said apertures for coupling to the associated exhaust system.

13. In the method of repairing a vehicle by mounting a replacement flange on the end of a catalytic converter having outwardly extending flanges along its sides and an outlet pipe which is coupled to the flange of the vehicle exhaust system and which converter is mounted upon the support structure of the vehicle, the steps comprising:
(a) providing a pair of coupling elements with opposed edges, each element having a generally vertically extending leg portion and a generally horizontally extending base portion, the opposing edges of said coupling elements having an arcuate configuration to seat a portion of the periphery of said outlet pipe of said catalytic converter and aligned opposed recesses to seat said side flanges of said catalytic converter, each of said coupling elements having a plurality of bolt receiving apertures therein;
(b) mounting on said base portion of one coupling element a channel element projecting beyond the end of said base portion;
(c) mounting the upper end of said leg portion of said one coupling element upon said support structure of said vehicle with the arcuate edge extending about a portion of said outlet pipe of said catalytic converter;
(d) moving the other one of said coupling elements horizontally to slidably seat its base portion in said channel and to seat the arcuate edge of said other coupling element about another portion of said outlet pipe of said catalytic converter, said channel element seating and joining the opposed ends of said base portions of said coupling elements and providing horizontal sliding motion therein of said other coupling element; and
(e) mounting the upper end of said leg portion of said other coupling element on said support structure of the vehicle; and
(f) coupling said flange of said exhaust system for the vehicle to other of said apertures of said coupling elements.

14. The method of replacing the end flange of the catalytic converter in accordance with claim 13 wherein said channel element is formed with an elongated, generally U-shaped configuration defined by a pair of vertical legs and a base, one of said legs having a groove in its inside surface extending along the length thereof, and said base portion of at least said other coupling element being formed with a boss thereon which slidably seats in said groove.

15. The method of replacing the end flange of the catalytic converter in accordance with claim 14 wherein each of said coupling elements is formed with a boss seated in said groove, and wherein said one coupling element and said channel element are fixedly engaged.

16. The method of replacing the end flange of the catalytic converter in accordance with claim 14 wherein each of said coupling elements is formed from generally plate material, and wherein internally threaded nuts are secured at the apertures for coupling to the exhaust system to seat threadably the shanks of fasteners which are inserted thereinto to effect such coupling.

* * * * *